US011915366B2

(12) United States Patent
Pourreza

(10) Patent No.: US 11,915,366 B2
(45) Date of Patent: Feb. 27, 2024

(54) PER-PLANT AERIAL IMAGE DATA ANALYTICS METHOD AND DEVICES

(71) Applicant: The Regents of the University of California, Oakland, CA (US)

(72) Inventor: Alireza Pourreza, Sacramento, CA (US)

(73) Assignee: The Regents of the University of California, Oakland, CA (US)

( * ) Notice: Subject to any disclaimer, the term of this patent is extended or adjusted under 35 U.S.C. 154(b) by 506 days.

(21) Appl. No.: 17/241,531

(22) Filed: Apr. 27, 2021

(65) Prior Publication Data

US 2022/0343593 A1    Oct. 27, 2022

(51) Int. Cl.
| | |
|---|---|
| G06T 17/00 | (2006.01) |
| G06T 15/80 | (2011.01) |
| G01S 17/89 | (2020.01) |
| G06V 10/26 | (2022.01) |
| G06V 10/75 | (2022.01) |
| G06V 20/10 | (2022.01) |

(52) U.S. Cl.
CPC ............. *G06T 17/00* (2013.01); *G01S 17/89* (2013.01); *G06T 15/80* (2013.01); *G06V 10/26* (2022.01); *G06V 10/751* (2022.01); *G06V 20/188* (2022.01); *G06V 2201/121* (2022.01)

(58) Field of Classification Search
CPC ......... G06T 17/00; G06T 15/80; G06T 17/05; G06T 2210/56; G01S 17/89; G01S 7/4808; G01S 17/86; G01S 17/88; G06V 10/26; G06V 10/751; G06V 20/188; G06V 2201/121; G06V 20/17; A01C 21/007; A01G 17/005
See application file for complete search history.

(56) References Cited

U.S. PATENT DOCUMENTS

| | | | |
|---|---|---|---|
| 11,763,557 B1 * | 9/2023 | Emerick | G06T 3/4038 382/110 |
| 2017/0176595 A1 * | 6/2017 | McPeek | G01N 33/025 |
| 2021/0279867 A1 * | 9/2021 | Silva | G06F 18/232 |
| 2023/0026679 A1 * | 1/2023 | Matarazzo | A01G 7/00 |

* cited by examiner

*Primary Examiner* — Said Broome
*Assistant Examiner* — Andrew Shin
(74) *Attorney, Agent, or Firm* — Park, Vaughan, Fleming & Dowler LLP

(57) ABSTRACT

The embodiments disclose a method comprising creating 3D models of an orchard with multiple plants in the form of a densified point cloud using oblique aerial RGB imaging and photogrammetry, identifying and segmenting individual plants of the orchard from the 3D models, simulating sunlight radiation in the 3D models, determining a shading effect of branches and neighboring plants on each individual plant at any time of the day, determining canopy light interception of each plant, analyzing canopy geometry of each plant in the 3D models, forecasting potential yield of each plant based on the measured canopy light interception and calculating nitrogen and water requirements of each plant based on the potential yield and other predetermined field, environmental and climate factors and validating the yield forecasting model using the canopy light interception data by measuring the actual yield for each plant.

20 Claims, 11 Drawing Sheets

| TABLE 5 | Orchard 1 | Orchard 2 | Orchard 3 | Total |
|---|---|---|---|---|
| Location (latitude and longitude) | N36.598229 W119.515579 | N36.598234 W119.513250 | N36.59880 W118.503137 | |
| Planting pattern | Square | Offset | Square | |
| Planting spacing | 6 m × 3 m | 6.5 m × 4 m | 6 m × 5.5 m | |
| Number of trees (sample proportion) | 722 (50.14%) | 449 (31.18%) | 269 (18.68%) | 1,440 |
| Number of blocks | 83 | 25 | 84 | 192 |
| Number of rows | 26 | 25 | 21 | 72 |
| Tree age | 6 | 6 | 11 | |
| Variety & number of trees (sample proportion) | 'P16.013'* 542 (37.64%) 'P13.019' 104 (7.22%) 'Lonestar' 67 (4.65%) | 'Nonpareil' 234 (16.25%) 'Wood Colony' 108 (7.50%) 'Monterey' 107 (7.43%) | 'Nonpareil' 89 (6.25%) 'Butte' 89 (6.18%) 'Carmel' 90 (6.25%) | |

*There are 9 (0.63%) inter-planted pollination trees in 'P16.013' rows that were not used in this study

FIG. 5

TABLE 6

| Variety | May 28 | | | June 26 | | | July 26 | | | August 7 | | |
|---|---|---|---|---|---|---|---|---|---|---|---|---|
| | $R^2$ | RMSE (%) | Slope | $R^2$ | RMSE (%) | Slope | $R^2$ | RMSE (%) | Slope | $R^2$ | RMSE (%) | Slope |
| All | 0.81 | 4.06** | 0.89 | 0.91 | 2.94** | 0.91 | 0.91 | 3.27** | 0.92 | 0.92 | 2.84** | 0.90 |
| 'Nonpareil' | 0.95 | 2.27** | 0.87 | 0.96 | 2.06** | 0.90 | 0.93 | 3.06* | 0.91 | 0.95 | 2.28** | 0.91 |

*Analysis of Variance (ANOVA) p<0.001 when the mean of absolute errors (%) to the regression line were tested against the 1:1 line
**ANOVA p<0.0001

FIG. 6

PER-PLANT AERIAL IMAGE DATA ANALYTICS METHOD AND DEVICES

BACKGROUND

Growers and farmers need tools for data management, processing, and interpretation to obtain early insights into plants' health and vigor conditions that will help them better manage crops and ensure the quality and yield at a later harvest. Current methods collect data for an entire field or orchard but fail to analyze the conditions as they affect each plant within that field or orchard. The growers and farmers are not given the advantage early to make applications of nutrients and other mediation measures to increase the yield on the plants negatively impacted.

SUMMARY OF THE INVENTION

The invention is a method for creating 3D models of an agricultural field with multiple plants in the form of a densified point cloud using oblique aerial RGB imaging and photogrammetry and measure canopy light interception per plant. In one embodiment, this includes identifying and segmenting individual plants of the orchard from the 3D models, simulating sunlight radiation in the 3D models; determining a shading effect of branches and neighboring plants on each individual plant at any time of the day; determining canopy light interception of each plant; analyzing canopy geometry of each plant in the 3D models; forecasting potential yield of each plant based on the measured canopy light interception and calculating nitrogen and water requirements of each plant based on the potential yield and other predetermined field, environmental and climate factors; and validating the canopy light interception by measuring the actual yield for each plant.

BRIEF DESCRIPTION OF THE DRAWINGS

FIG. 5 shows for illustrative purposes only an example in Table 5 of details of the experimental orchards used to test this invention of one embodiment.

FIG. 6 shows for illustrative purposes only an example of a comparison of correlations between fPAR Virtual Orchard estimate obtained four different times during a season (May, June, July, August) and fPAR lightbar estimate obtained in June of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of per-plant aerial image data analytics method and devices is described for illustrative purposes and the underlying system can apply to any number and multiple types of sensing technologies. In one embodiment of the present invention, the per-plant aerial image data analytics method and devices can be configured using photogrammetry. The per-plant aerial image data analytics method and devices can be configured to include processing aerial imagery to create 3D models of plants and can be configured to include extracting canopy profile features per-plant using the present invention.

The present invention uses imaging and sensing technologies, including advanced geospatial canopy monitoring, for assisting growers, farmers, agricultural consultants, and scientists to increase the economic and environmental sustainability of food production systems. The present invention collects data from the sensing technologies combined with traditional plant and soil monitoring on a per plant basis to improve crop management practices and increase yield.

In one embodiment of the present invention, 3D models of an orchard are created with multiple plants in the form of a densified point cloud using oblique aerial RGB imaging and photogrammetry. The individual plants of the orchard are identified and segmented from the 3D models. Also, sunlight radiation is simulated in the 3D models and a shading effect of branches and neighboring plants are determined on each individual plant at any time of the day. Next, canopy light interception is determined for each plant and canopy geometry is analyzed for each plant in the 3D models. The potential yield of each plant is forecasted based on the measured canopy light interception and nitrogen and water requirements are calculated for each plant based on the potential yield and other predetermined field, environmental and climate factors. The canopy light interception is then validated by measuring the actual yield for each plant.

Figure 1:
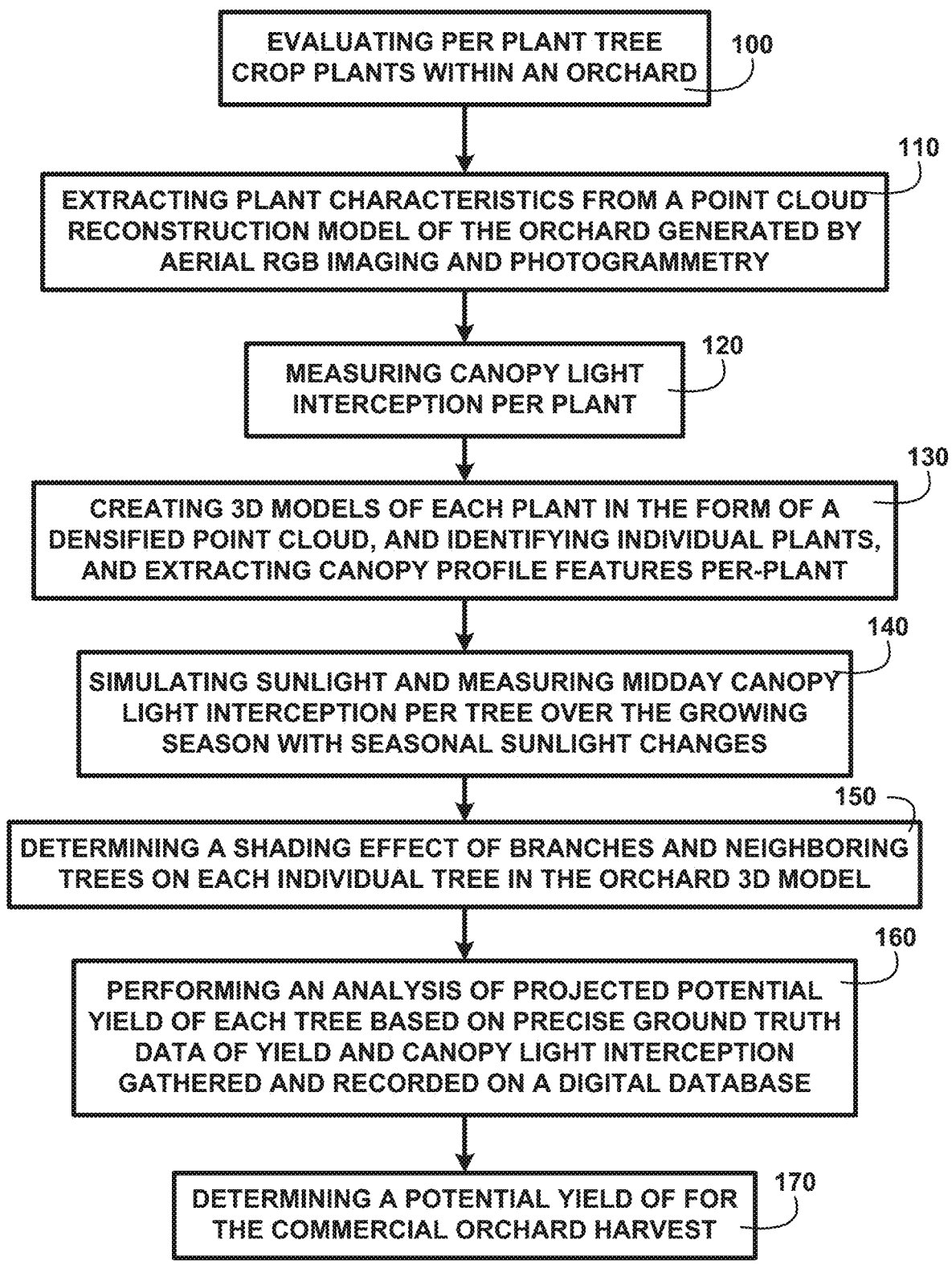
FIG. 1 shows a block diagram of an overview of measuring canopy light interception using the 3D model of an orchard with multiple plants of one embodiment.

FIG. 1 shows a block diagram of an overview of measuring canopy light interception using the 3D models of an orchard with multiple plants of one embodiment. FIG. 1 shows creating 3D models of an orchard with multiple plants in the form of a densified point cloud using oblique aerial RGB imaging and photogrammetry 100. Identifying and segmenting individual plants of the orchard from the 3D models 110. Simulating sunlight radiation of each plant in the 3D models 120. Measuring canopy light interception per plant. Determining a shading effect of branches and neighboring plants on each individual plant at any time of the day 130. Determining canopy light interception of each plant 140. Analyzing canopy geometry of each plant in the 3D models 150. Analyzing canopy geometry of each plant in the 3D models uses the sun angle and irradiance variation during the day and each of the trees corresponding shadow angles affecting canopy light interception variation over time. Forecasting potential yield of each plant based on the measured canopy light interception 160. Calculating nitrogen and water requirements of each plant based on the potential yield and other predetermined field, environmental and climate factors 170. Validating the canopy light interception by measuring the actual yield for each plant 180.

In another embodiment per plant aerial data collection will utilize adopting a digital surface model (DSM) 201 model generated by the Light Detection and Ranging (LiDAR) sensors instead of RGB photogrammetry, where LiDAR has much higher point cloud resolutions. The data collection will include the nitrogen and irrigation scheduling effects on the plants into account when evaluating the correlation between estimated fPAR and plant "fruit" yield. Additionally the processing will employ the spectral reflectance to determine tree nitrogen status and to better explain the yield variations in trees with similar canopy light interceptions.

Measuring canopy light interception per plant and its correlation to potential yield method and devices is a method for per-plant aerial image data interpretation pipeline providing aerial image acquisition, processing, and analytics includes acquiring imagery by a manned or unmanned aerial system, processing the imagery to create 3D models of plants in the form of a densified point cloud, and identifying individual plants, and extracting canopy light interception and other profile features per-plant. Canopy productivity and input requirement knowledge are estimated by interpreting the canopy profile details.

The following descriptions and figures are shown in one embodiment for an orchard growing tree crops. It should be understood that this invention is applicable for use on all crops and growing conditions including trees and field crop plants.

The per-plant aerial image data analytics method and devices establishes a data collection, processing, and analytics pipeline for accurate, precise, and early yield prediction by leveraging affordable and accessible aerial imaging technology and advanced machine learning algorithms. Early yield forecasting is an important milestone on multiple fronts, such as irrigation and nutrient use efficiency, and industry forecasting, among others. Yield prediction has become a priority for growers in California because it enables them to accurately estimate and apply seasonal nitrogen demand and prevent violation of the nitrogen management regulations that does not allow overapplication of nitrogen. Accurate forecasting of yield is difficult due to the complex affecting factors, such as blossom condition, environmental temperature, soil status, irrigation volume/stress, variety, and age.

One major determinant of yield is the amount of sunlight that is intercepted by the canopy. Solar energy is used for the photosynthesis process in which carbohydrates are produced from water and carbon dioxide. The visible range in the electromagnetic spectrum (400-700 nm) is known as photosynthetically active radiation (PAR), which is commonly defined as the quantity of photons per unit time per unit area that is intercepted by tree canopy. In practical use, light intercepted by the canopy during the solar noon (also known as the incoming Fractional PAR (fPAR)) is determined by measuring the PAR below and above the canopy using a mobile lightbar platform and presented as the percentage of light intercepted by a tree. The size of the tree's shadow on the ground at the solar noon is also an indication of fPAR. Measuring f PAR can provide growers with an accurate estimation of canopy biomass. fPAR is the most important factor in determining the maximum amount of yield that an orchard can potentially produce under an optimum condition (no stress, no extreme weather, and no pest/disease). A mature almond tree can produce up to 58 lbs. of dried kernel yield per acre for each 1% of fPAR intercepted by the canopy.

In one embodiment, plant characteristics are extracted from a point cloud reconstruction model of an orchard generated by oblique aerial RGB imaging. A validated interpretation models can translate extracted features into insight (yield prediction). A per tree potential yield estimation technique can provide early insight into the expected yield. In one embodiment the application of this invention is measuring canopy light interception and its correlation to potential yield. Estimation of potential yield is the critical determinant of the plant's water and nitrogen requirement. This method uses real-size 3D models of the orchard (created by aerial RGB imaging and photogrammetry technique) to simulate sunlight and measure mid-day canopy light interception per tree. This method considers the shading effect of branches and neighboring trees. This method is validated by three years of precise ground truth data (yield and canopy light interception). Shown in these descriptions and examples are embodiments customized for tree crops. This invention provides a novel insight into field variability. A sustainable food production system requires this information to conduct site-specific management.

The method is configured for per-plant aerial image data collection. The per-plant aerial image data collection utilizes aerial image acquisition, processing, and analytics, it includes acquiring imagery by a manned or unmanned aerial system, processing the imagery to create 3D models of plants in the form of a densified point cloud, and identifying individual plants, and extracting canopy profile features per-plant. Canopy productivity and plant's water and nitrogen input requirement knowledge are estimated by interpreting the canopy profile details.

DETAILED DESCRIPTION

Figure 2:
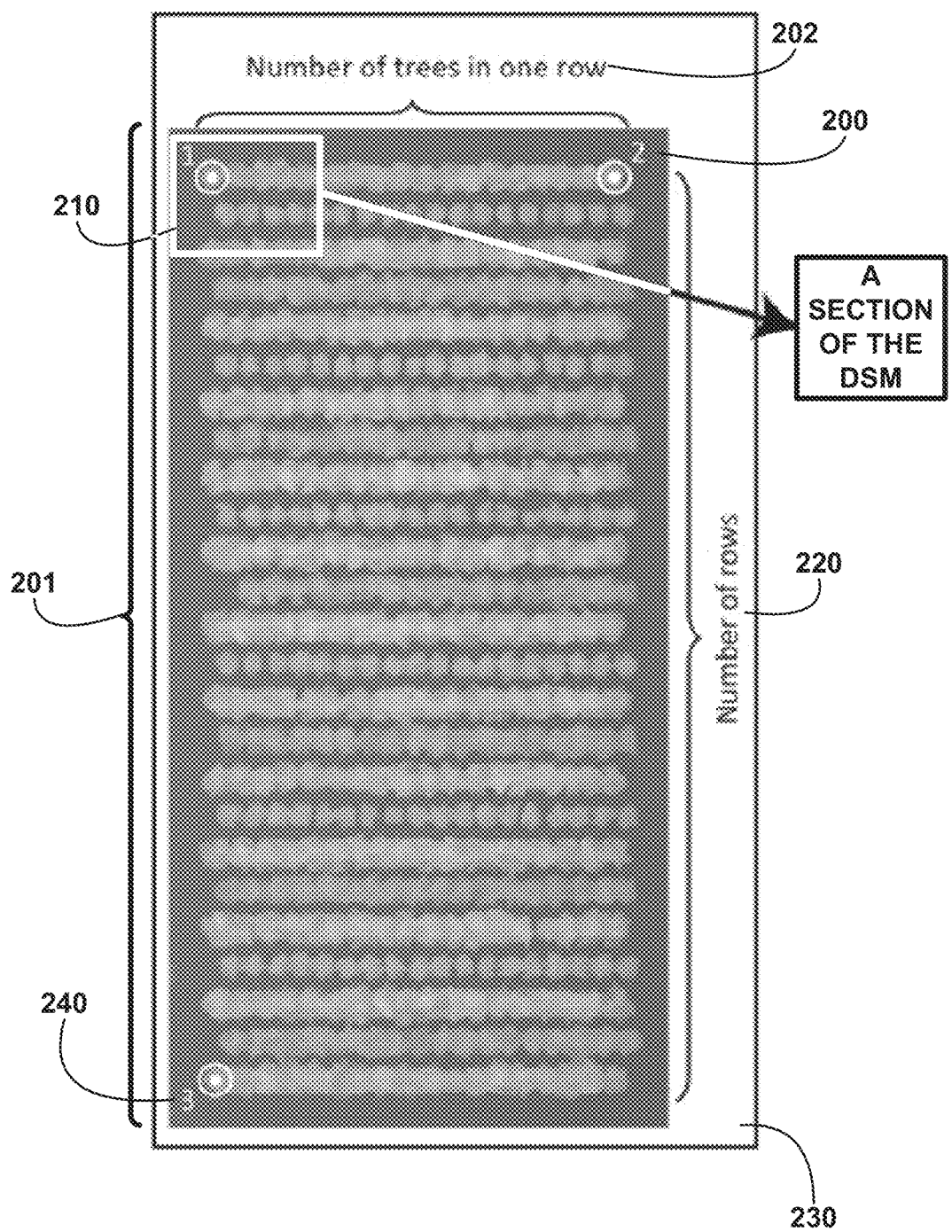
FIG. 2 shows for illustrative purposes only an example of a digital surface model (DSM) of orchard 2 of one embodiment.

FIG. 2 shows for illustrative purposes only an example of a digital surface model (DSM) of orchard 2 of one embodiment. FIG. 2 shows a digital surface model (DSM) of orchard 2 200. The DSM shows the number of trees in a row 202. A section of the DSM 210 is shown in detail in FIG. 3. Also showing is the number of rows 220. The digital surface model (DSM) of orchard 2 200 and some input parameters such as number of rows 220, number of trees per row 202, and coordinates of tree trunk in three corners: for orchard orientation, three points are placed at the orchard map corners (numeric labels), which form two vectors describing the orientation 230. The orchard map three corners are identified with numeric labels 240 of one embodiment.

In one embodiment, aerial data collection and preprocessing is used and includes Aerial RGB image acquisition. Aerial RGB image acquisition includes temporal aerial imagery from experimental orchards using an unmanned aerial vehicle (UAV), also known as a drone that includes an embedded RGB camera. In this embodiment, the field of view of the camera's lens was 84°, and the size of each image was 5,472×3,648 pixels. The collected aerial images are in a single grid mission pattern at an altitude of 40 m above ground level (AGL), with an oblique angle of 70°, and with a front and side overlap of 85%. With such flight mission parameters, the collection of imagery can be completed in 2 min per acre and obtained a ground sampling distance of 1.6 cm per pixel. The images are pre-processed using photogrammetry software to reconstruct a 3D point cloud and generate the digital surface model (DSM) 201 of the orchards. The aerial data collections were conducted four times during the 2019 season on May 28/29, June 26, July 26, and August 7 to investigate the canopy development during the season of one embodiment.

In one embodiment, DSMs 201 are processed for identification of tree centers. A complete processing pipeline can be developed as a Virtual Orchard (VO) library. A suitable programming language can be used, such as Python 3.7 to calculate canopy profile features. In this embodiment, the tree center points were laid out in a grid with the VO library using user-supplied parameters: the number of trees per row 202, orchard orientation points, number of rows 220, planting pattern, and row and tree spacing 300. The orchard orientation can be defined by three points placed at the tree centers in the orchard's corners. In this embodiment, these three points can form two vectors, where the first vector extends along the direction of the row (formed by points 1 and 2), and the second vector is perpendicular to the first (formed by points 1 and 3). The processing can be used to calculate the canopy allocated area for each tree using the tree centers, orchard orientation, row spacing 310 and tree spacing 300 of one embodiment.

Figure 3:
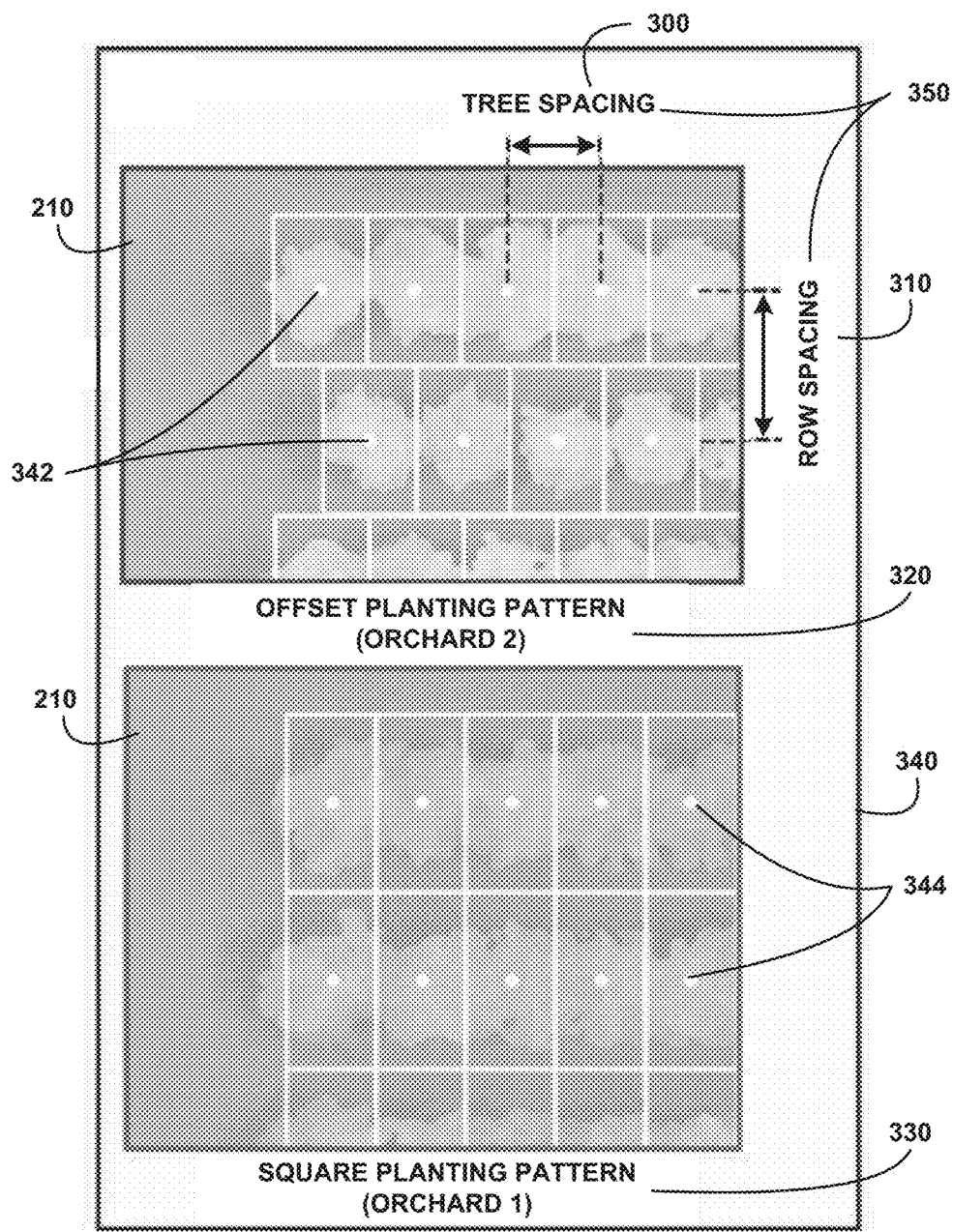
FIG. 3 shows for illustrative purposes only an example of orchard planting patterns of one embodiment.

FIG. 3 shows for illustrative purposes only an example of orchard planting patterns of one embodiment. FIG. 3 shows orchard planting patterns in the RGB orthomosaic of orchard 2. Determining orchard planting patterns includes a digital surface model (DSM) of orchard 2 200 and some input parameters such as number of rows 220, number of trees per row 202, and coordinates of tree trunk in three corners. Showing the detail of the section of the DSM 210 from FIG. 2 additional input parameters including row/tree spacing and planting pattern are analyzed 340. Tree spacing 300 and row spacing 310 are defined by the distance between the centers of the tree 350. The offset planting pattern assumes that tree centers in adjacent rows are offset by half of the tree spacing 342. The square planting pattern assumes that tree centers in adjacent rows are aligned 344. Canopy cover is the percentage of canopy footprint area divided by the canopy allocated area.

In another embodiment, digital elevation models (DEM) are created. In this embodiment. First, a DEM from the DSM 201 is created to normalize tree heights from above sea level (ASL) to above ground level (AGL). DSM 201 pixels belonging to trees are first identified by calculating the slope. DSM 201 pixels with a slope greater than 20% (an empirically determined threshold) are classified as trees in a binary mask. A closing morphological operation using a circular structural element is then applied to the binary mask to fill in the holes where the canopy slope was less than 20%. This step creates a closed binary mask. Selection of the structural element's size is based on the size of the holes and the resolution of the DSM 201. The process inverted the closed binary mask and applied the inverted mask to the DSM 201 to segment ground pixels.

In this embodiment, the missing ground pixels (under the tree canopy in DSM 201) are predicted using a nearest-neighbor interpolation technique. Second, the process extracts the canopy area by segmenting pixels with a predefined minimum elevation above the ground in the normalized DSM 201. The process uses contour approximation on the segmented DSM 201 to create a vectorized polygon that overlaid each tree's canopy footprint. For tree canopies that extended beyond its canopy allocated area, the canopy footprint polygon was clipped to the allocated area's extent. The process collates the polygons into a shapefile and uses it for further canopy feature extraction.

In another embodiment, canopy profile features can be explained using data extracted from four canopy profile features from the normalized DSM 201 including canopy cover, canopy volume index, average canopy height, and maximum canopy height. Canopy cover is calculated as the percentage of the canopy allocated area filled by the canopy footprint area. The canopy volume index is calculated by taking the ground adjusted height values within each tree's canopy and multiplying it by the pixel area defined by DSM's spatial resolution. The canopy volume index includes the volume between the tree crown surface and the ground by summing up the volume of each pixel (PX) as calculated, where N is the total number of tree pixels. The average and maximum canopy heights are also calculated for each tree of one embodiment.

Figure 4:
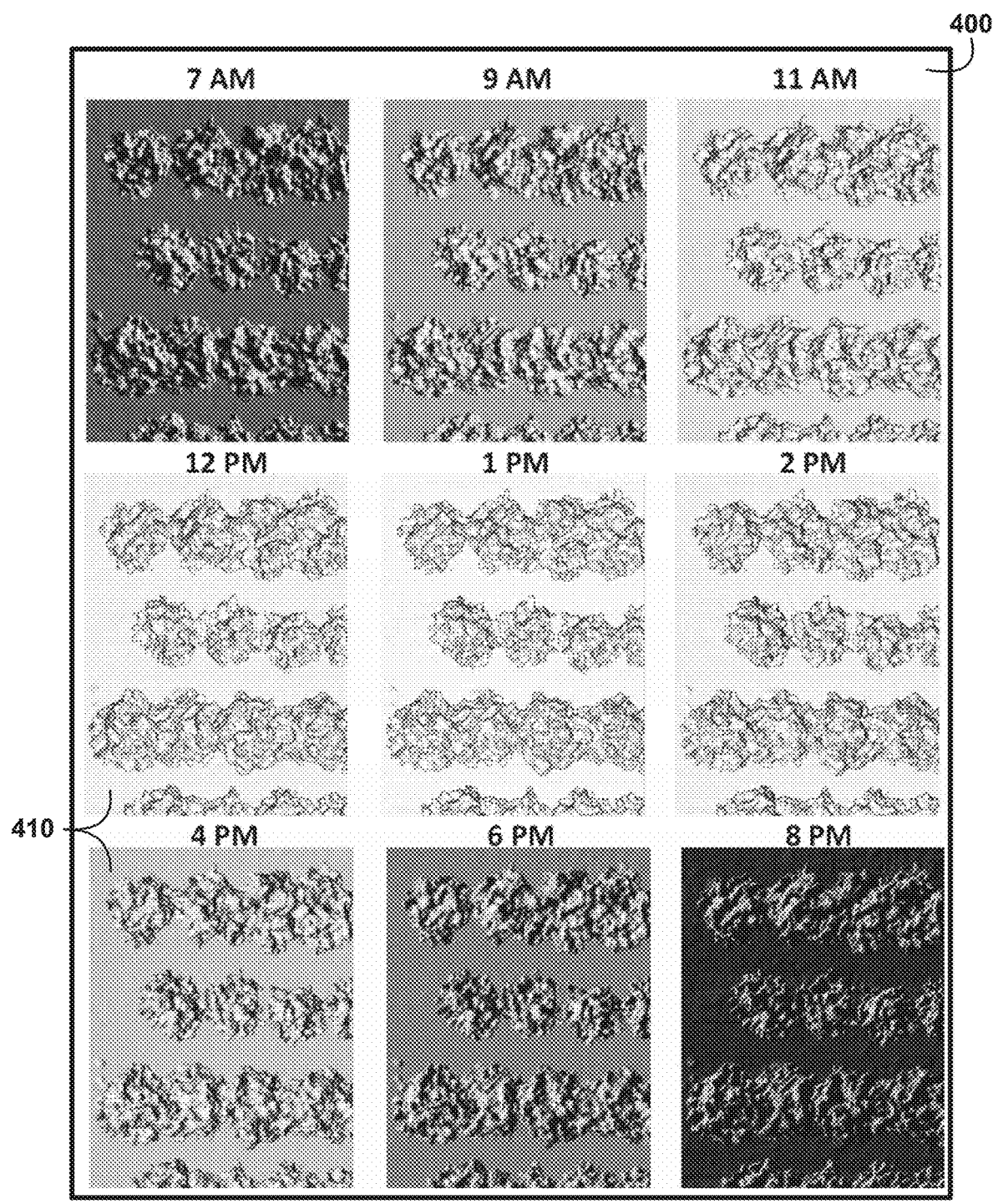
FIG. 4 shows for illustrative purposes only an example of shadow condition at different times of a day of one embodiment.

FIG. 4 shows for illustrative purposes only an example of shadow condition at different times of a day of one embodiment. FIG. 4 shows shadow condition at different times of a day 400 (from 7 AM to 8 PM) in mid-June, an indication of canopy light interception variation over time. FIG. 4 shows the north-west corner of the orchard 2. Shadow conditions at different times of a day (from 7 AM to 8 PM) in mid-June, provides an indication of canopy light interception variation over time for each tree and its impact on surrounding trees 410 of one embodiment. fPAR is defined by simulating sunlight around the solar noon and measuring canopy light interception.

FIG. 5 shows for illustrative purposes only an example in Table 5 of details of the experimental orchards used to test this invention of one embodiment. FIG. 5 shows details of the experimental orchards 500. The Table 6B data includes for all three orchards the location by latitude and longitude coordinates, planting pattern, planting spacing, number of trees, number of blocks, number of rows 220, tree age, variety and number of trees of one embodiment.

FIG. 6 shows for illustrative purposes only an example of a comparison of correlations between fPAR Virtual Orchard estimate obtained four different times during a season (May, June, July, August) and fPAR lightbar estimate obtained in June of one embodiment. FIG. 6 shows a comparison of correlations between fPAR Virtual Orchard estimate obtained four different times during a season (May, June, July, and August) and fPAR lightbar estimate obtained in June at the per-row level. Table 6 600 shows the correlations comparing the estimated midday (solar noon) canopy fPAR data at intervals during the growing season. The estimated midday (solar noon) canopy f PAR are shown for May 28, June 26, July 26, and August 7 610 over a growing season at the per-row level.

In one embodiment, the method calculates the fPAR as the main VO canopy profile feature. In one embodiment, the shading in DSM 201 gets lighter from the tree center to the edge (from top view) due to the canopy density decrease. This indicates that the VO canopy cover feature contains sufficient information to understand the amount of light intercepted by the canopy to predict yield of one embodiment.

Figure 7:
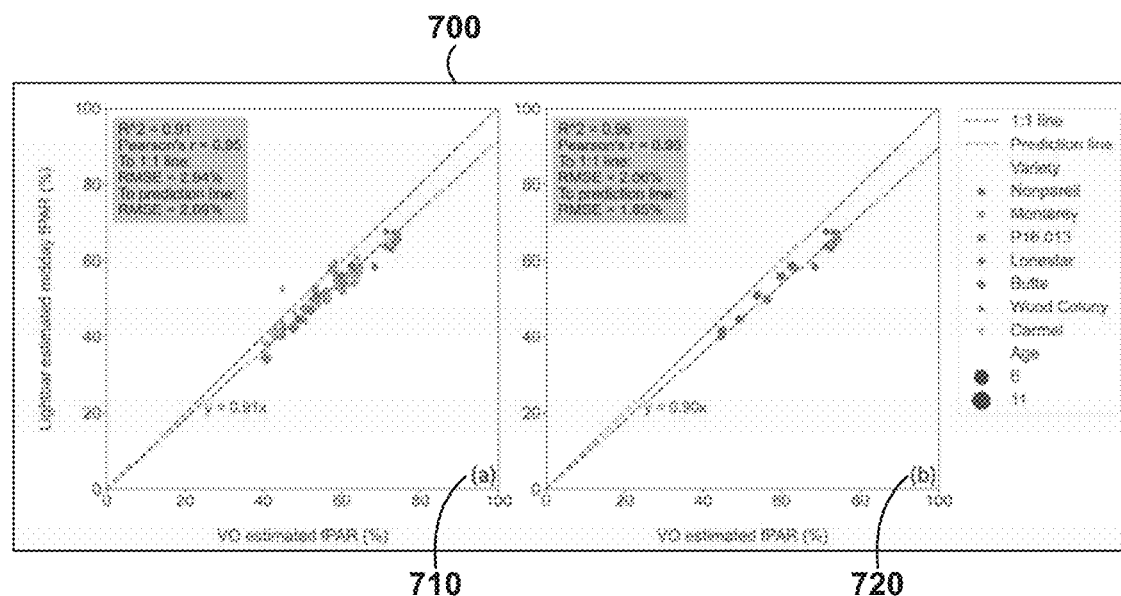
FIG. 7 shows for illustrative purposes only an example of correlation between fPAR Virtual Orchard estimate and fPAR lightbar estimate of one embodiment.

FIG. 7 shows for illustrative purposes only an example of correlation between fPAR Virtual Orchard estimate and fPAR lightbar estimate of one embodiment. FIG. 7 shows correlations between fPAR Virtual Orchard estimate and f PAR lightbar estimate for all almond cultivars (left) and 'Nonpareil' only (right) 700 at the per-row level and when forcing a zero intercept of one embodiment.

Figures 8A, 8B:
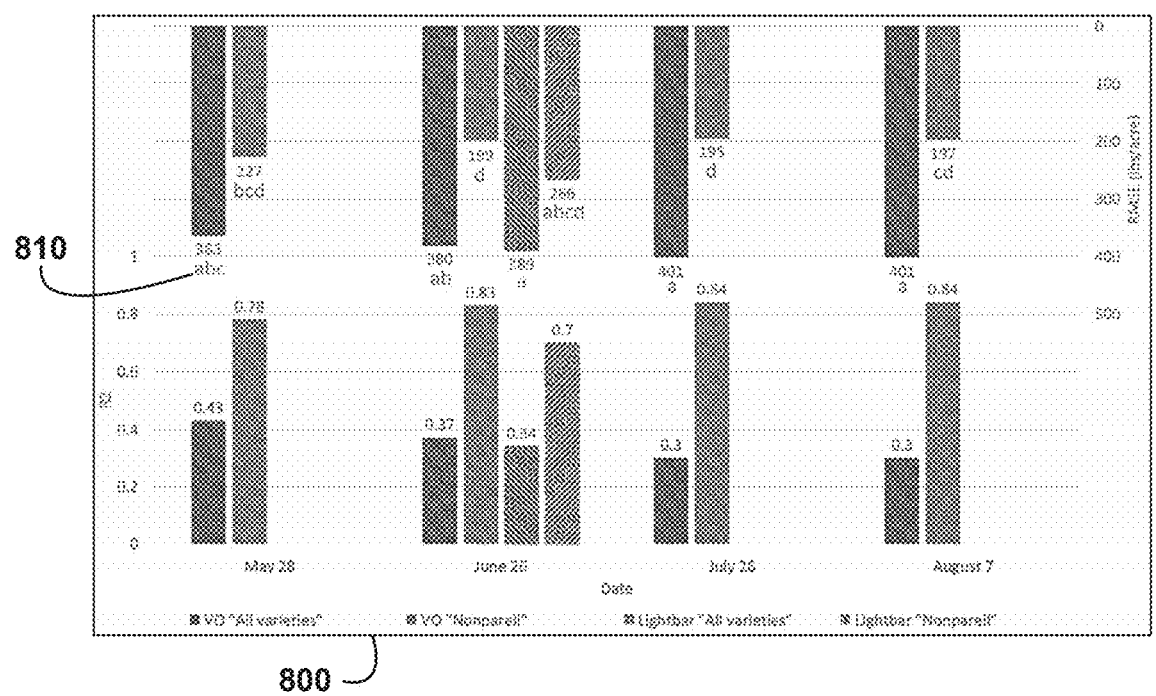
FIG. 8A shows for illustrative purposes only an example of a comparison between fPAR Virtual Orchard estimate obtained four different times during a season (May, June, July, August) or fPAR lightbar estimate obtained in June and actual almond yield with per-row precision of one embodiment.
FIG. 8B shows for illustrative purposes only an example of a comparison between fPAR Virtual Orchard estimate obtained four different times during a season (May, June, July, August) and actual kernel yield with per-tree precision of one embodiment.

FIG. 8A shows for illustrative purposes only an example of a comparison between fPAR Virtual Orchard estimate obtained four different times during a season (May, June, July, August) or fPAR lightbar estimate obtained in June and actual almond yield with per-row precision of one embodiment. FIG. 8A shows a comparison between fPAR Virtual Orchard estimate obtained four different times during a season (May, June, July, August) or fPAR lightbar estimate obtained in June and actual almond kernel yield for all varieties and 'Nonpareil' only over the season at the per-row level 800. Different letters refer to a statistically significant difference testing the means of absolute errors in predicting actual almond yield with different regression models using Analysis of Variance (ANOVA) multi-comparison ($p<0.05$) 820 of one embodiment.

FIG. 8B shows for illustrative purposes only an example of a comparison between fPAR Virtual Orchard estimate obtained four different times during a season (May, June, July, August) and actual kernel yield with per-tree precision of one embodiment.

FIG. 8B shows a comparison between fPAR Virtual Orchard estimate obtained four different times during a season (May, June, July, August) and actual almond kernel yield for all varieties and 'Nonpareil' only over a growing season at the per-tree level. Different letters refer to a statistically significant difference testing the means of absolute errors in predicting actual almond yield with different regression models using Analysis of Variance (ANOVA) multi-comparison ($p<0.05$) 810 of one embodiment.

Figure 9:
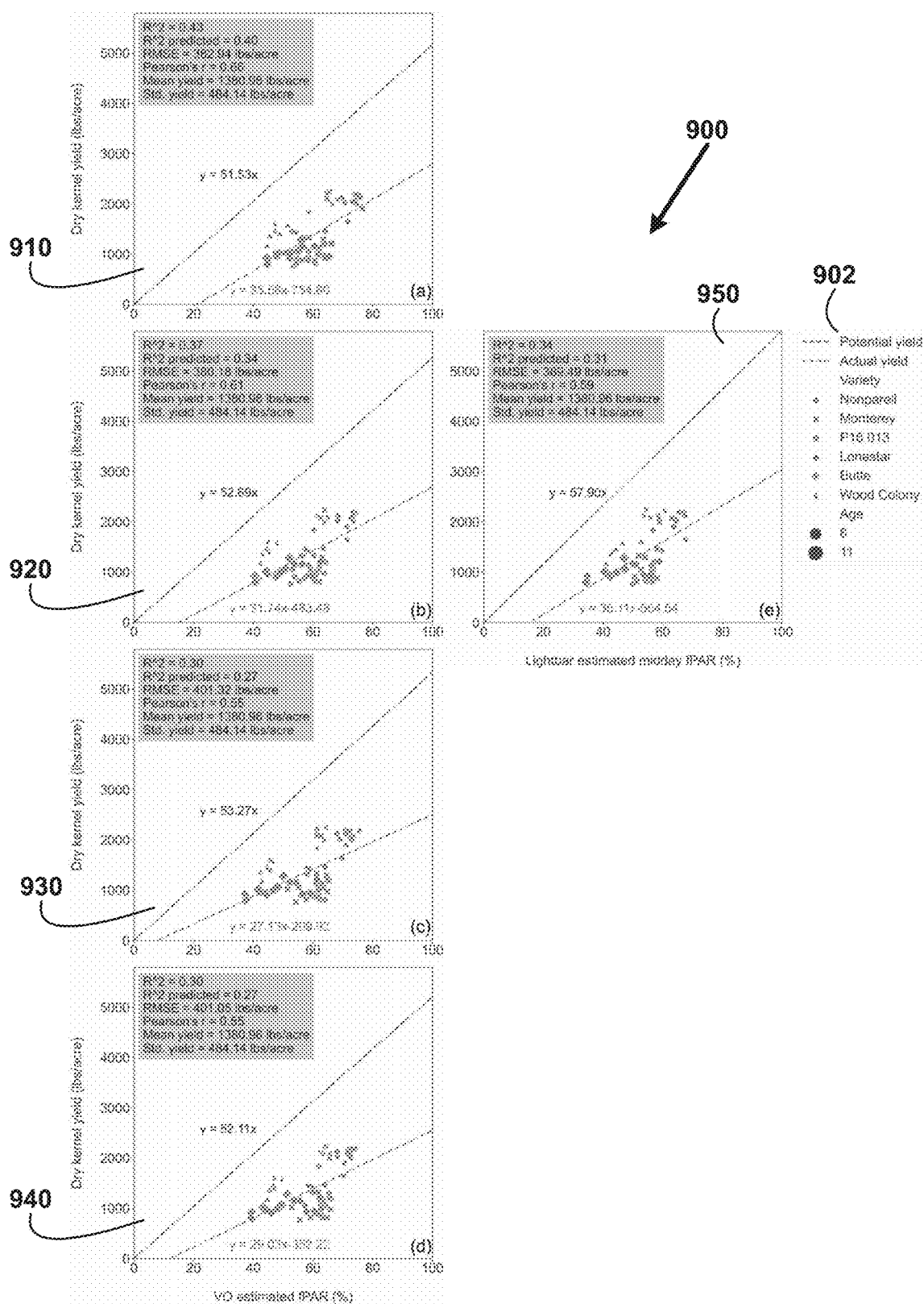
FIG. 9 shows for illustrative purposes only an example of comparison of correlations between actual yield and f PAR Virtual Orchard estimate (left) or fPAR lightbar estimate (right) at the per-row level of one embodiment.

FIG. 9 shows for illustrative purposes only an example of comparison of correlations between actual yield and f PAR Virtual Orchard estimate (left) or fPAR lightbar estimate (right) at the per-row level of one embodiment. FIG. 9 shows a comparison of accuracies of actual almond yield predicted by fPAR Virtual Orchard estimate over the season 900: May 28 (a) 910, June 26 (b) 920, July 26 (c) 930, August 7 (d) 940, or fPAR lightbar estimate (June 26) (e) 950 at the per-row level. Comparison graphic symbols are identified in the table at the right 902 of one embodiment.

Figure 10:
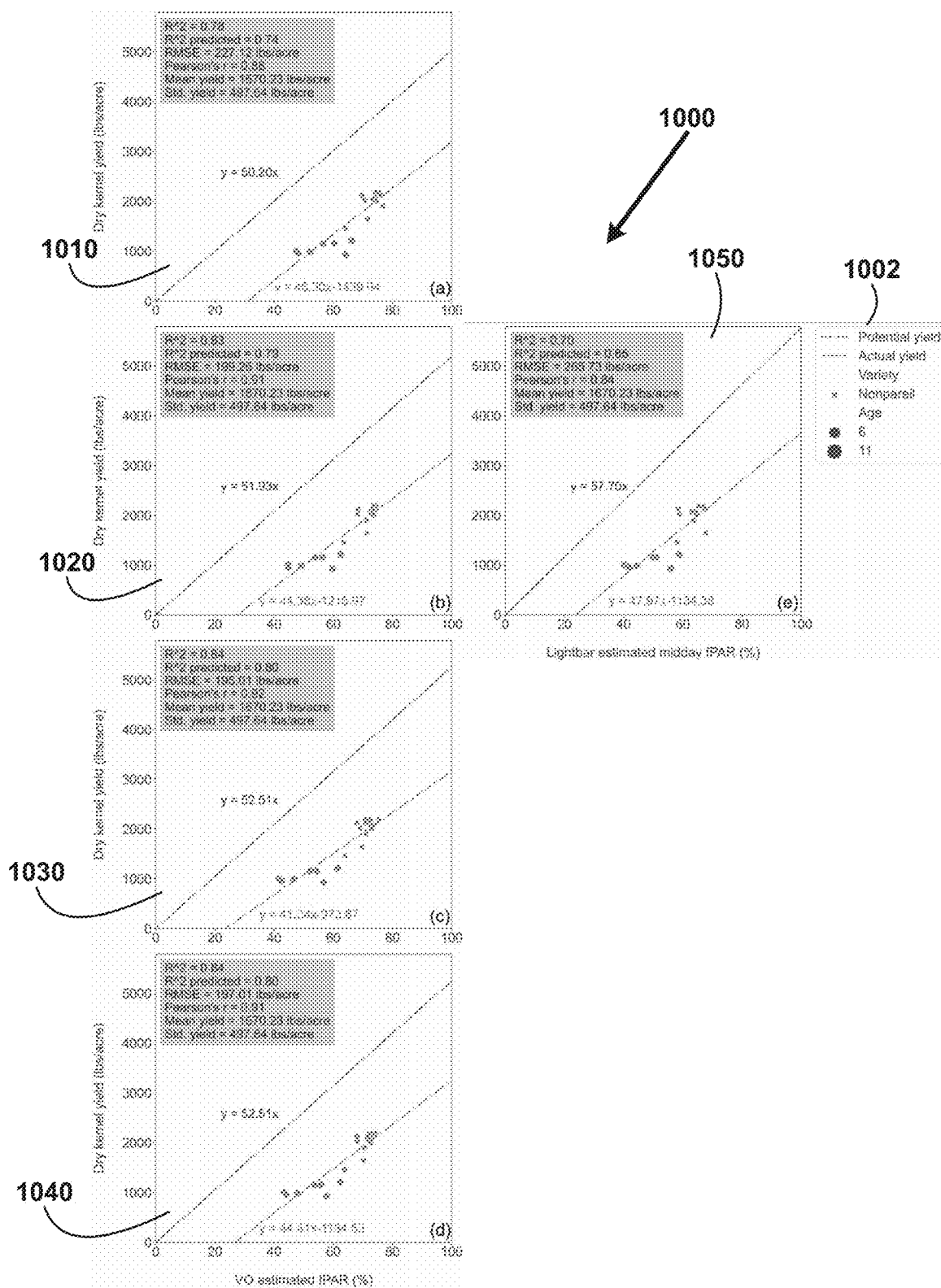
FIG. 10 shows for illustrative purposes only an example of a comparison of correlations between actual 'nonpareil' yield and f PAR Virtual Orchard estimate (left) or fPAR lightbar estimate (right) at the per-row level of one embodiment.

FIG. 10 shows for illustrative purposes only an example of a comparison of correlations between actual 'nonpareil' yield and f PAR Virtual Orchard estimate (left) or fPAR lightbar estimate (right) at the per-row level of one embodiment. FIG. 10 shows a comparison of accuracies of actual 'Nonpareil' almond yield predicted by fPAR Virtual Orchard estimate over the season 1000: May 28 (a) 1010, June 26 (b) 1020, July 26 (c) 1030, August 7 (d) 1040, or by fPAR lightbar estimate (June 26) (e) 1050 at the per-row level. Comparison graphic symbols are identified in the table at the right 1002 of one embodiment.

Figure 11:
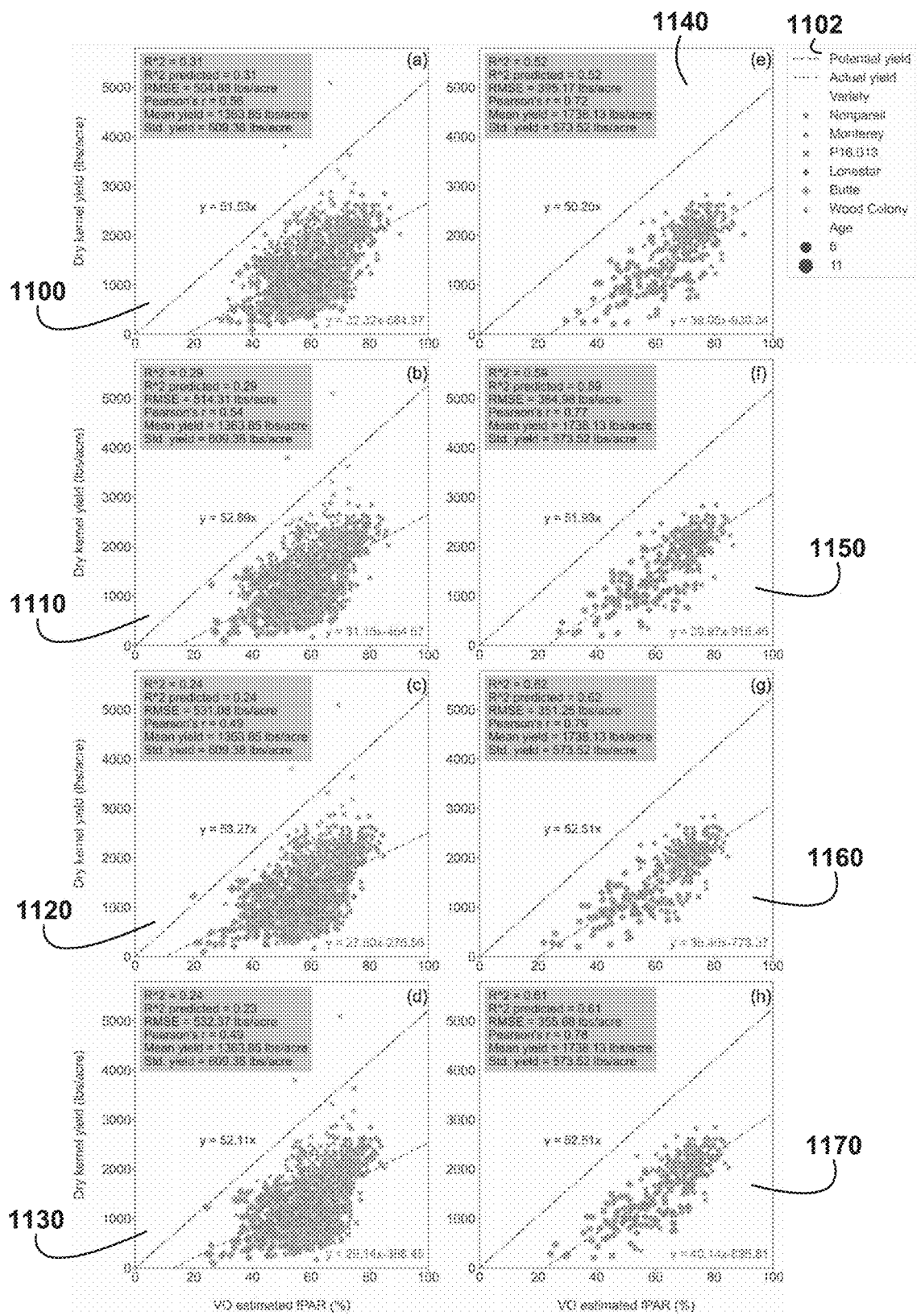
FIG. 11 shows for illustrative purposes only an example of a comparison of correlations between actual yield (left: several cultivars; right: 'nonpareil' only) and fPAR Virtual Orchard estimate at the per-row level of one embodiment.

FIG. 11 shows for illustrative purposes only an example of a comparison of correlations between actual yield (left: several cultivars; right: 'nonpareil' only) and fPAR Virtual Orchard estimate at the per-tree level of one embodiment. FIG. 11 shows a comparison of accuracies of actual almond yield predicted by fPAR Virtual Orchard estimate over the season with all varieties (left): May 28 (a) 1100, June 26 (b) 1110, July 26 (c) 1120, and August 7 (d) 1130; and 'Nonpareil' only (right): May 28 (e) 1140, June 26 (f) 1150, July 26 (g) 1160, and August 7 (h) 1170 at the per-tree level. Comparison graphic symbols are identified in the table at the right 1102 of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
creating 3D models of an orchard with multiple plants in the form of a densified point cloud using oblique aerial RGB imaging and photogrammetry;
identifying and segmenting individual plants of the orchard from the 3D models;
simulating sunlight radiation of each plant in the 3D models;
determining a shading effect of branches and neighboring plants on each individual plant at any time of the day;
determining canopy light interception of each plant;
extracting and analyzing canopy profile features of each plant in the 3D models;
forecasting potential yield of each plant based on the measured canopy light interception;
calculating nitrogen and water requirements of each plant based on the potential yield and other predetermined field, environmental and climate factors; and
providing a measured actual yield for each plant to validate yield forecasting by canopy light interception data.

2. The method of claim 1, further comprising creating 3D models of an orchard with multiple plants in the form of a densified point cloud using a digital surface model (DSM) generated by Light Detection and Ranging (LiDAR) sensors, wherein LiDAR has much higher pixel resolutions.

3. The method of claim 1, further comprising identifying and segmenting individual plants of the orchard from the 3D models by extracting canopy profile features per-plant by segmenting pixels with a predefined minimum elevation above the ground in a normalized DSM.

4. The method of claim 1, further comprising simulating sunlight radiation of each plant in the 3D models over a growing season during the solar noon (also known as the incoming Fractional PAR (fPAR)) by measuring the percentage of sunlight intercepted by a tree canopy.

5. The method of claim 1, further comprising determining a shading effect of branches and neighboring plants on each individual plant at any time of the day will consider the sun angle and irradiance variation during the day.

6. The method of claim 1, further comprising determining canopy light interception of each plant analyses shadow conditions at different times of a day (from 7 AM to 8 PM) in mid-June for providing an indication of canopy light interception variation over time for each tree and its impact on surrounding trees.

7. The method of claim 1, further comprising analyzing canopy geometry of each plant in the 3D models utilizing sun angle and irradiance variation during the day and each trees corresponding shadow angles affecting canopy light interception variation over time.

8. The method of claim 1, further comprising forecasting potential yield of each plant based on the measured canopy light interception uses real-size 3D models of the orchard to simulate sunlight and measure mid-day (solar noon) canopy light interception per tree including the shading effect of branches and neighboring trees.

9. The method of claim 1, further comprising calculating nitrogen and water requirements of each plant based on the potential yield and other predetermined field, environmental and climate factors includes spectral reflectance to determine a tree nitrogen status.

10. The method of claim 1, further comprising validating the yield forecasting model using canopy light interception data by measuring the actual yield for each plant and comparing to the canopy light interception of the corresponding plant.

11. An apparatus, comprising:
at least one device configured for creating 3D models of an orchard with multiple plants in the form of a densified point cloud using oblique aerial RGB imaging and photogrammetry;
at least one device configured for identifying and segmenting individual plants of the orchard from the 3D models;
at least one device configured for simulating sunlight radiation of each plant in the 3D models;
at least one device configured for determining a shading effect of branches and neighboring plants on each individual plant at any time of the day;
at least one device configured for determining canopy light interception of each plant;
at least one device configured for analyzing canopy geometry of each plant in the 3D models;
at least one device configured for forecasting potential yield of each plant based on the measured canopy light interception;
at least one device configured for calculating nitrogen and water requirements of each plant based on the potential yield and other predetermined field, environmental and climate factors; and
at least one device configured for validating the yield forecasting model using canopy light interception data by measuring the actual yield for each plant.

12. The apparatus of claim 11, further comprising at least one device configured for processing aerial imagery to create 3D models of plants and configured to include extracting canopy profile features per-plant.

13. The apparatus of claim 11, further comprising at least one device configured for calculating nitrogen and water requirements of each plant based on potential yield forecasted by the virtual orchard (VO) method, and field, environmental and climate factors as well as spectral reflectance to determine a tree nitrogen status.

14. The apparatus of claim 11, further comprising at least one device configured for determining canopy light interception of each plant based on measured canopy light interception using real-size 3D models of the orchard to simulate sunlight and measure mid-day canopy light interception per tree including the shading effect of branches and neighboring trees.

15. The apparatus of claim 11, further comprising at least one device configured for identifying and segmenting individual plants of the orchard from the 3D models by extracting canopy profile features per-plant by segmenting pixels with a predefined minimum elevation above the ground in a normalized DSM.

16. An apparatus, comprising:
at least one device configured for collecting per plant canopy profile features using 3D models created by aerial imagery in an orchard;
at least one device configured for identifying and segmenting individual plants of the orchard from the 3D models;
at least one device configured for creating real-size 3D images of each plant to simulate sunlight and measure mid-day canopy light interception per tree;
at least one device configured for simulating sunlight radiation of each plant in the real-size 3D models;
at least one device configured for determining a shading effect of branches and neighboring plants on each individual plant at any time of the day;
at least one device configured for measuring canopy light interception for each plant over a growing season; and
at least one device configured for forecasting potential yield of each plant based on the measured canopy light interception.

17. The apparatus of claim 16, further comprising at least one device configured for collecting per plant canopy profile features using 3D models created by at least one Light Detection and Ranging (LiDAR) sensor.

18. The apparatus of claim 16, further comprising at least one device configured for extracting canopy profile features per-plant by segmenting pixels of the real-size 3D models with a predefined minimum elevation above the ground.

19. The apparatus of claim 16, further comprising at least one device configured for calculating nitrogen and water requirements of each plant based on potential yield forecasted by the virtual orchard (VO) method, and field, environmental and climate factors as well as spectral reflectance to determine a tree nitrogen status for use in precision crop management.

20. The apparatus of claim 16, further comprising at least one device for analyzing canopy geometry of each plant in the 3D models utilizing sun angle and irradiance variation during the day and each trees corresponding shadow angles affecting canopy light interception variation over time.

* * * * *